(12) United States Patent
Srinivasa et al.

(10) Patent No.: US 8,131,217 B2
(45) Date of Patent: Mar. 6, 2012

(54) IDENTIFICATION OF MAKE AND MODEL OF COMMUNICATION DEVICES OVER BLUETOOTH PROTOCOL

(75) Inventors: Shreyas B Srinivasa, Karnataka (IN); Mahesh Manjunath, Karnataka (IN); Ravi Bangalore Ramarao, Karnataka (IN)

(73) Assignee: Telibrahma Convergent Communications Private Limited, Bangalore (IN)

( * ) Notice: Subject to any disclaimer, the term of this patent is extended or adjusted under 35 U.S.C. 154(b) by 363 days.

(21) Appl. No.: 12/415,000

(22) Filed: Mar. 31, 2009

(65) Prior Publication Data
US 2010/0248627 A1 Sep. 30, 2010

(51) Int. Cl.
*H04B 7/00* (2006.01)
(52) U.S. Cl. ........................ 455/41.2; 340/13.2
(58) Field of Classification Search .................. 455/41.2; 340/13.2–13.36
See application file for complete search history.

(56) References Cited

U.S. PATENT DOCUMENTS

| | | | | |
|---|---|---|---|---|
| 6,856,789 B2* | 2/2005 | Pattabiraman et al. | ...... | 455/41.2 |
| 7,920,849 B2* | 4/2011 | Pop | ............................ | 455/414.1 |
| 2004/0266347 A1* | 12/2004 | Palin et al. | .................... | 455/41.1 |
| 2006/0030263 A1* | 2/2006 | Seligmann et al. | .......... | 455/41.2 |
| 2007/0149122 A1* | 6/2007 | Murphy | ........................ | 455/41.2 |
| 2007/0294710 A1* | 12/2007 | Meesseman | .................. | 719/328 |
| 2008/0261526 A1* | 10/2008 | Suresh | ......................... | 455/41.2 |
| 2009/0037256 A1* | 2/2009 | Rivetti et al. | .................... | 705/10 |
| 2009/0196258 A1* | 8/2009 | Escobar Sanz et al. | ........ | 370/332 |
| 2010/0011049 A1* | 1/2010 | Newman et al. | .............. | 709/203 |
| 2010/0015919 A1* | 1/2010 | Tian | ............... | 455/41.2 |
| 2010/0248627 A1* | 9/2010 | S. et al. | ......................... | 455/41.2 |
| 2010/0255778 A1* | 10/2010 | Lovell et al. | .................. | 455/41.2 |
| 2011/0009102 A1* | 1/2011 | Almodovar Herraiz et al. | .......................... | 455/414.2 |
| 2011/0107417 A1* | 5/2011 | Balay et al. | ...................... | 726/22 |

FOREIGN PATENT DOCUMENTS
WO   WO2008098483   *   8/2008

* cited by examiner

Primary Examiner — Lincoln Donovan
Assistant Examiner — Adam Houston
(74) Attorney, Agent, or Firm — Rahman LLC

(57) ABSTRACT

Embodiments herein provide methods and systems for identifying make and model, and other features of a communication device using the MAC ID, profile name and services offered on the communication device. Also, disclosed herein is a method of building a database where a range of MAC IDs is mapped to a particular make and model, and other features of communication devices. On obtaining the MAC ID of a communication device, the make and model, and other features of the device can be identified. Such information may be used to tailor content according to the capabilities of a communication device.

15 Claims, 10 Drawing Sheets

IDENTIFICATION OF MAKE AND MODEL OF COMMUNICATION DEVICES OVER BLUETOOTH PROTOCOL

TECHNICAL FIELD

The embodiments herein generally relate to Bluetooth systems, and, more particularly, to identifying make and model of communication devices using Bluetooth.

BACKGROUND

Presently, in a network, whether the network is a computer network, a cellular network or a network using any other technology, the type of devices connected to the device may vary. Some of the devices may be able to process and present richer forms of data, like images, flash content, javascript etc, while other devices will only be capable of processing text and presenting the same to the user. If the network sends the same content to all of the devices, some devices will be unable to present all the supplied information and therefore some devices will be under utilized. Devices may not only differ in what content can be presented by them, but also differ in the size of their displays, resolutions of the display, operating systems, programming interfaces etc.

In networking, devices connected to the network can be identified by the network controller using a user agent. On connecting to a network, the user agent sends information regarding the device to the network controller, where the information comprises of information necessary to identify the device.

However, in Bluetooth, there is no user agent and hence the Bluetooth network controller has no means to identify the devices present on the Bluetooth network.

SUMMARY

In view of the foregoing, an embodiment herein provides a method for identifying a make and model of a communication device using Bluetooth, wherein the communication devices are connected to a Bluetooth network, the network comprising of a plurality of Bluetooth terminals and a server, the method comprising steps of the plurality of Bluetooth terminals collecting information from a plurality of communication devices wherein the information comprises of MAC IDs of the plurality of communication devices; profile names of the plurality of communication devices; and services running on the plurality of communication devices; the server building a table, wherein the table maps a range of MAC IDs of the plurality of communication devices to make and model of the communication devices; the server identifying make and model of the communication device using MAC ID of the communication device and the table; and the server delivering content to the communication device using Bluetooth, wherein the content is customized according to make and model of the communication device. The server updates the table, on receiving a MAC ID not present in the table.

In other embodiments, MAC ID apart from being mapped to make an model information of a communication device, may also be mapped to other features of communication devices including but not limited to the kind of data that communication devices can process, the screen dimensions of the device, the services that can be run on a communication device, the processing capability of the device and so on. Such information relating to features may be derived using the make and model information or obtained from the devices directly through any other suitable mechanism by the server.

Also disclosed herein is a server, the server connected to a plurality of Bluetooth terminals and the Bluetooth terminals connected to a plurality of communication devices, the server comprising of a receiving means to receive information about the plurality of communication devices from the plurality of Bluetooth terminals; a creation means for creating a table, wherein the table maps a range of MAC IDs of the plurality of communication devices to make and model of the communication devices; an identification means for identifying make and model of the communication device using MAC ID of the communication device and the table; and a delivery means for delivering content to the communication device using Bluetooth, wherein the content is customized according to make and model of the communication device. The server updates the table, on receiving a MAC ID not present in the table.

Embodiments herein also disclose a terminal connected to a server and a plurality of communication devices using Bluetooth, the terminal comprising of a means adapted to collect information from a plurality of communication devices, the information comprises of MAC IDs of the plurality of communication devices; profile names of the plurality of communication devices; and services running on the plurality of communication devices.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following description with reference to the drawings, in which.

DESCRIPTION OF EMBODIMENTS

Figure 1:
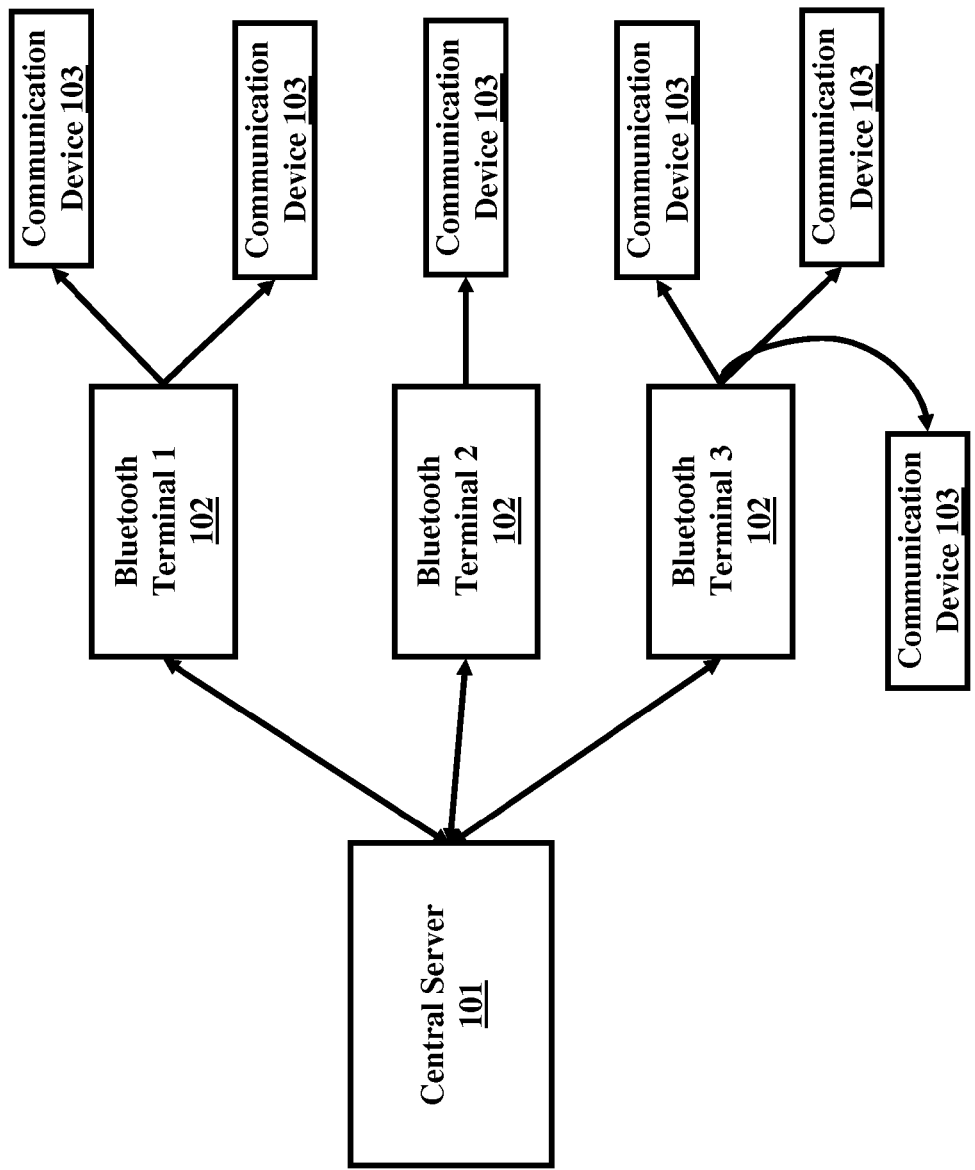
FIG. 1 illustrates a Bluetooth network, in accordance with various embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method and system for identifying make and model of a communications device using Bluetooth. Referring now to the drawings, and more particularly to FIGS. 1 through 9, where similar reference characters denote corresponding features consistently throughout the figures, there are shown preferred embodiments.

The embodiments herein disclose a method and system for a Bluetooth network to identify the make and model of communication devices connected to the Bluetooth network, using the MAC ID of the communication devices. The Bluetooth network initially starts by collecting information from a large number of communication devices, which are connected to the Bluetooth network. The information collected from the communication devices comprises of MAC ID of the communication device, services present on the communication device and the Bluetooth profile name of the device. The information collected from the communication devices is used by a server to build a database of services offered and capabilities of the communication device with a particular make and model of the device. A table is created where the MAC ID of a communication device is mapped to a particular make and model of communication device. On a communication device connecting to the Bluetooth network, the Bluetooth network uses the MAC ID of the communication device and detects the make and model of the communication device using the table. Once the make and model of the communication device are detected, then content delivered to the communication device will be customized according to the services and capabilities of the communication device.

FIG. 1 illustrates a Bluetooth network, in accordance with various embodiments disclosed herein. The elements as depicted in FIG. 1 are a central server 101, a plurality of Bluetooth terminals 102 and a plurality of communication devices 103. The server 101 receives information from a plurality of Bluetooth terminals 102, which have collected the information from a large number of communication devices 103. The server uses the information, the information comprising of MAC ID of the communication devices 103, services present on the communication devices 103 and Bluetooth profile name of the devices 103, to create a database of make and model of the communication devices 103 against the services and capabilities of the communication devices 103. Also, the server 103 maps a range of MAC IDs to a specific make and model of communication device 103. When a communication device 103 connects to a Bluetooth terminal 102, the MAC ID of the device 103 is used to identify the make and model of the connected communication device 103. Once, the make and model of the communication device 103 has been identified, the content to be sent to the device 103 is customized according to the capabilities and services present on the communication device 103.

One example of the server 101 is a general purpose server computer apparatus with a suitable processor like a Pentium Xeon Processor and a suitable operating system like a Windows Server operating system.

In other embodiments, MAC ID apart from being mapped to make an model information of a communication device, may also be mapped to other features of communication devices including but not limited to the kind of data that communication devices can process, the screen dimensions of the device, the services that can be run on a communication device, the processing capability of the device and so on. Such information relating to features may be derived using the make and model information or obtained from the devices directly through any other suitable mechanism by the server.

Figure 2:
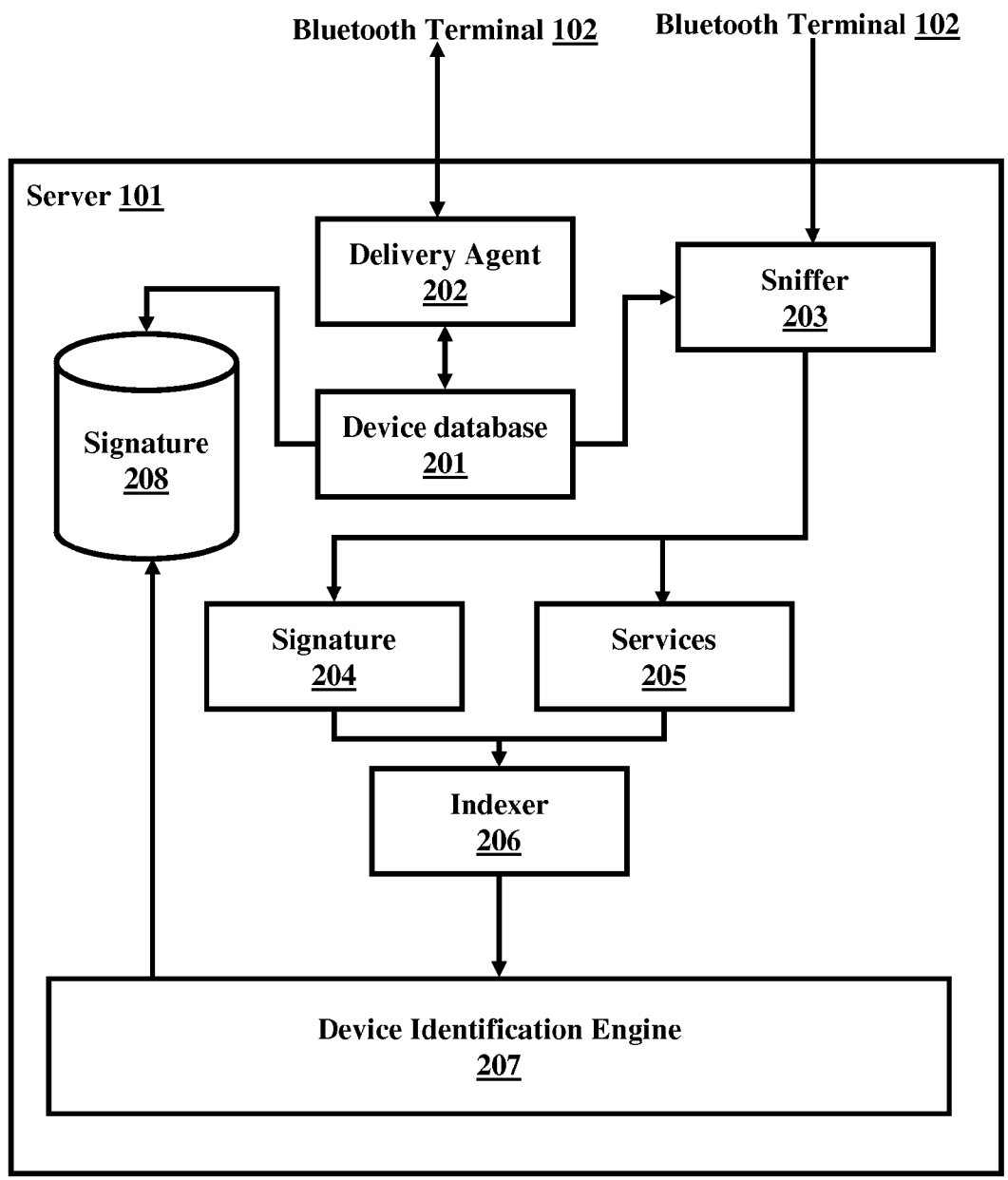
FIG. 2 illustrates a server, in accordance with various embodiments disclosed herein.

FIG. 2 depicts a server, in accordance with embodiments disclosed herein. The server 101 comprises of a device database 201, a delivery agent 202, a sniffer 203, a signature module 204, a services module 205, an indexer 206, a device identification engine 207 and a signature module 208. The sniffer 203 receives all the MAC IDs collected by the Bluetooth terminals 102. The sniffer 203 checks the received MAC IDs for any new MAC ID. On detecting a new MAC ID, the sniffer 203 with the help of the signature module 204 and services module 205, extracts the device signature and services running on the communication device 103 to which the MAC ID belongs. The device signature comprises of profile name and MAC ID of the communication device 103. The sniffer 203 sends the information collected, comprising of the device signature and services running to the indexer 206. The indexer 206 stores the information received from the sniffer 203 in an internal database. The device identification engine 207 fetches the information from the indexer 206 at specified times. The device identification engine 207 updates the device database 201 based on a new MAC IDs that have been detected. The device identification engine 207 enables identification of a communication device 103 depending on the MAC ID of the communication device 103. The device identification engine 207 also comprises algorithms required to enable the identification of a communication device 103 depending on the MAC ID of the communication device 103. The device database 201 comprises of a plurality of databases and contains a list of communication devices already identified and their capabilities in terms of screen size and features. The delivery agent 202 sends a request to the Bluetooth terminals 102 before delivering response to a communication device 103, as response depends on the content configured and capabilities of the specific communication device 103. The delivery agent 202 checks the device database 201. If the MAC ID of the requesting communication device 103 is within the MAC ID range of a model stored in the device database 201, the delivery agent 202 recognizes the communication device 103 and delivers content specific to the communication device 103, depending on the capabilities and features of the communication device 103.

Figure 3:
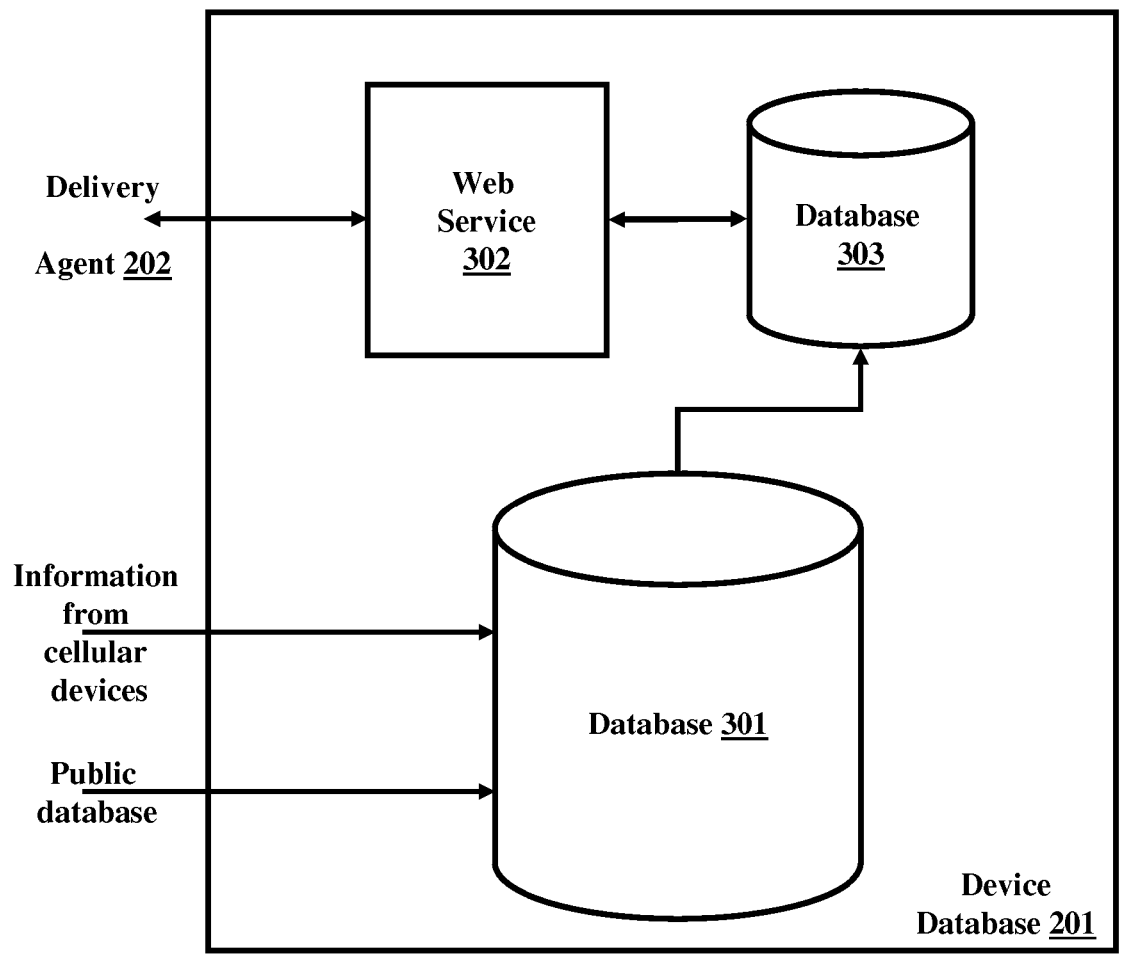
FIG. 3 illustrates a device database, in accordance with embodiments disclosed herein.

FIG. 3 depicts databases present in a server, according to an embodiment disclosed herein. The database 201 present in the server comprises of a first database 301 and a second database 302. The first database 301 is dynamic database which collects information and data from a plurality of sources; the sources may be a table of discovered Bluetooth devices with the default name, a public database and the like. The default name comprises of the brand and model of the device. The public database may be any database that is open to public access like the Institute of Electrical and Electronics Engineers (IEEE) Organizationally Unique Identifier (OUI) database. The first database 301 periodically updates the second database 302 with information received by the first database 301 from the plurality of sources. The second database 302 is a stable and up-to-date database of MAC IDs and the corresponding make and models of communication devices 103. Also, present is a web service 303 which given a MAC ID of a communication device 103 by the device agent 202, fetches the make and model of the communication device 103 from the second database 302 and sends the information about the communication device 103 to the device agent 202.

Figure 4:
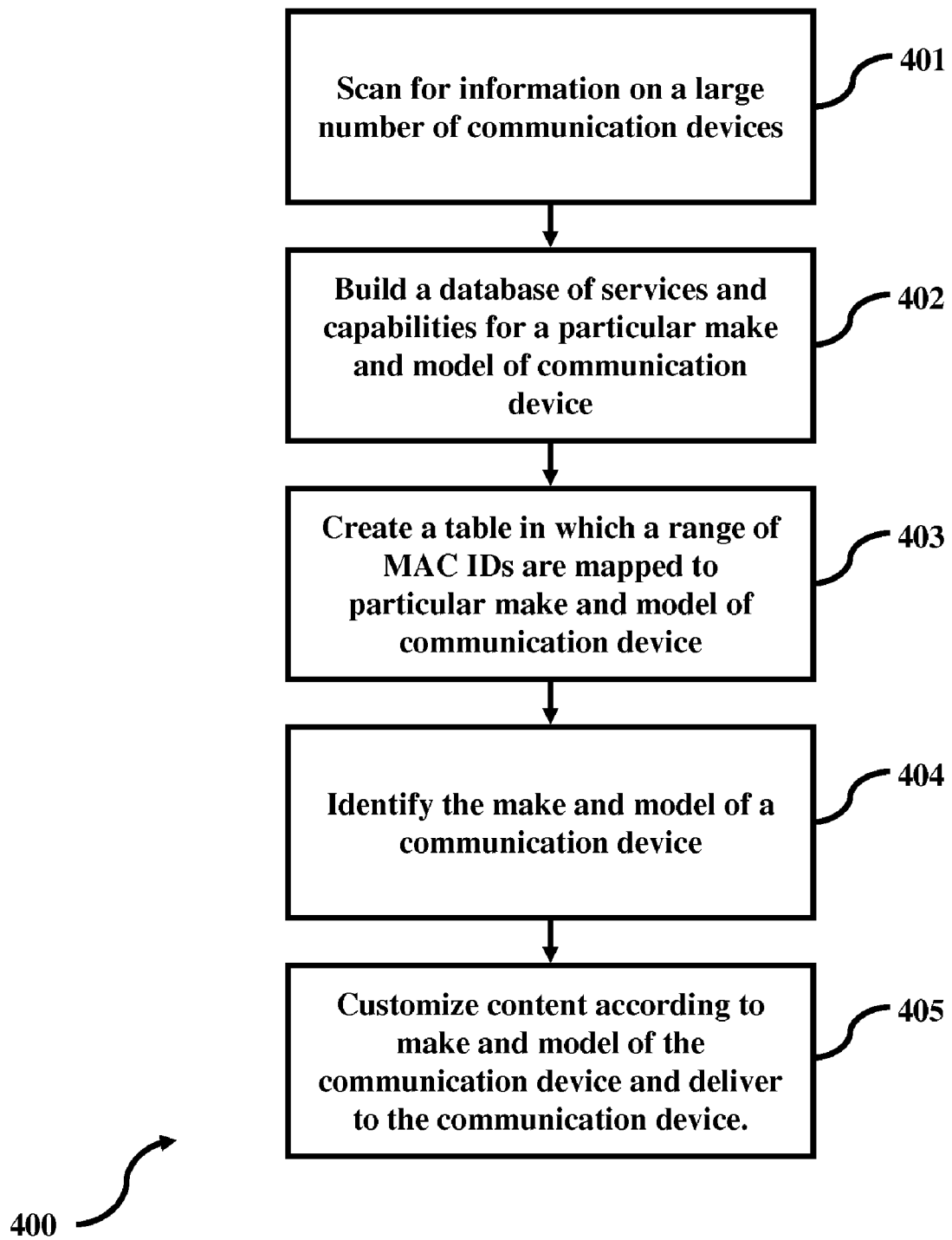
FIG. 4 is a flowchart depicting a process, in accordance with embodiments disclosed herein.

FIG. 4 is a flowchart depicting a process, in accordance with embodiments disclosed herein. The Bluetooth terminals 102 scans and collects (401) information from a large number of communication devices. The information collected by the Bluetooth terminals 102 comprises of MAC ID of the communication device 103, Bluetooth profile name of the communication device 103 and services present on the communication device 103. The Bluetooth terminal 102 sends the information to the central server 101. The server 101 builds (402) a database of capabilities and services present on a particular make and model of communication device. The server also creates (403) one or more tables in which a range of MAC IDs are mapped to a particular make and model of communication device. The table is stored by the server 101 in the device database 201 present in the server 101. When a communication device 103 connects to the Bluetooth network through the Bluetooth terminal 102, the MAC ID of the communication device 103 is sent to the server 101. The server 101 identifies (404) the make and model of the communication device using the table. The server customizes (405) content according to the make and model of the communication device 103 and delivers the content to the communication device 103 through the Bluetooth terminal 102. The content sent to the communication device 103 depends on the capabilities and services present on the communication device 103. For example, a communication device 103 capable of displaying flash content, will get content richer in flash content, as compared to a second communication device 103 which can only display textual content, which will get only content in text format. The various actions in method 400 may be performed in the order presented, in a different order or simultaneously. Further, in some embodiments, some actions listed in FIG. 4 may be omitted.

Figure 5:
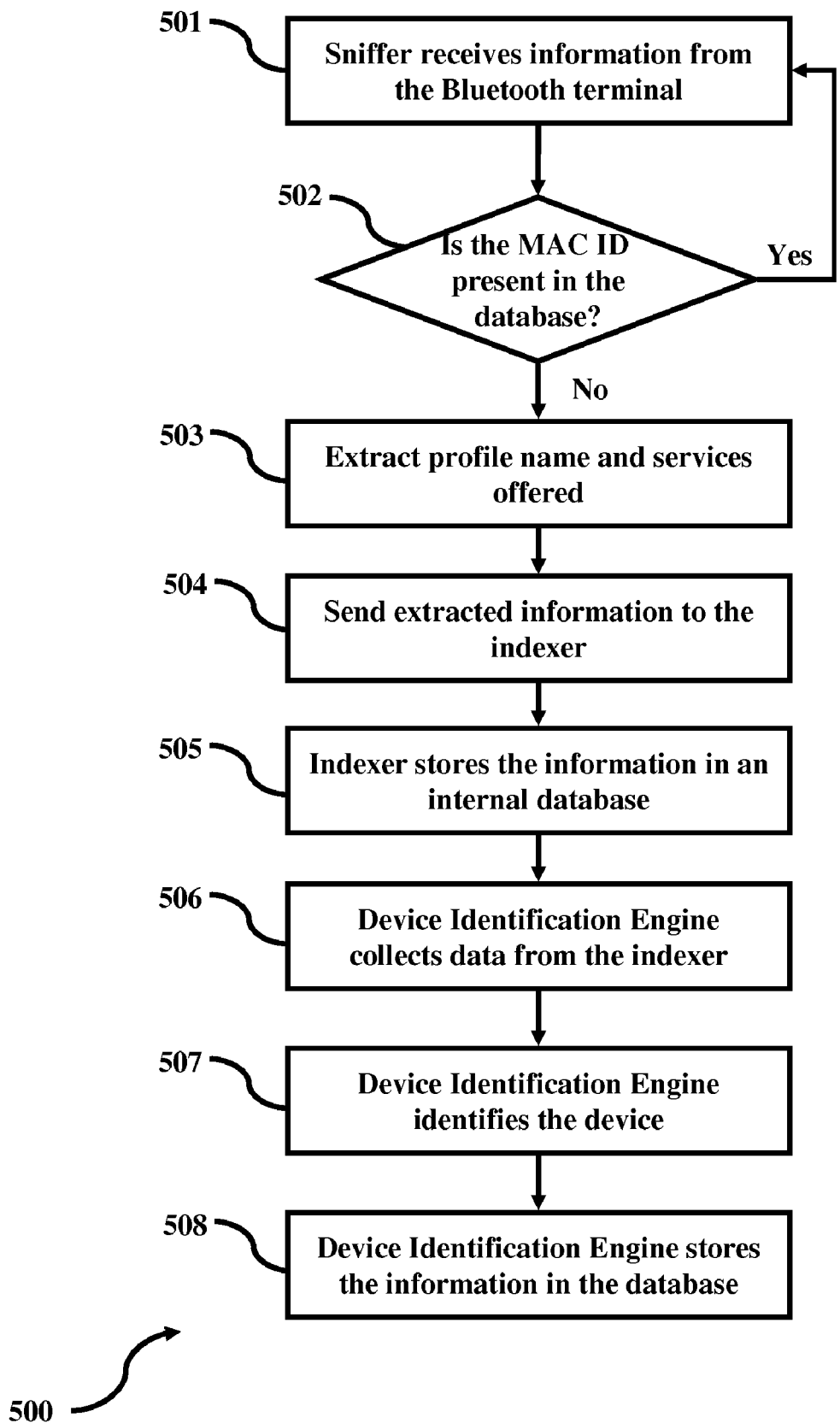
FIG. 5 is a flowchart depicting a process, in accordance with embodiments disclosed herein.

FIG. 5 is a flowchart depicting a process, in accordance with embodiments disclosed herein. The Bluetooth terminal 102 collects information about communication devices 103 connected to the Bluetooth terminal 102. The Bluetooth terminal 102 sends the information to the sniffer module 203 present in the server 101. The sniffer 203 receives (501) the information from the Bluetooth terminal 102. The information collected by the Bluetooth terminal 102 comprises of information like profile, services offered on the communication device 103. The profile further comprises of MAC ID of the communication device 103 and profile name of the communication device 103. The sniffer 203 checks (502) if the MAC ID sent is already present in the device database 201. If the MAC ID is present in the device database 201, then the sniffer 203 awaits the arrival of information of another communication device 103 from the Bluetooth terminal 102. If the MAC ID is not present in the device database 201, the sniffer 203 extracts (503) information about the device 103 including services present on the device 103, profile name and MAC ID of the communication device 103 using the signature module 204 and services module 205. The sniffer 203 then sends (504) the extracted information to the indexer 206. The indexer 206 stores (505) the extracted information in an internal database. The device identification engine 207 collects (506) data stored in the internal database of the indexer 206 at periodic intervals. The periodic intervals can be modified by the operator of the network, depending on the circumstances. The device identification engine 207 identifies (507) the make and model of the communication device 103 depending on the MAC ID of the communication device 103. The device identification engine 207 updates (508) the table stored in the device database 201 with the information. The various actions in method 500 may be performed in the order presented, in a different order or simultaneously. Further, in some embodiments, some actions listed in FIG. 5 may be omitted.

In other embodiments, the device identification engine also updates existing data relating to specific MAC ID (or communication device) when there is a change in features of that device. When the server identifies a device for which data already exists on the server, the server may identify new services on the device that did not exist before. As an example, such a scenario can occur due to upgradation of software on the device.

Figure 6:
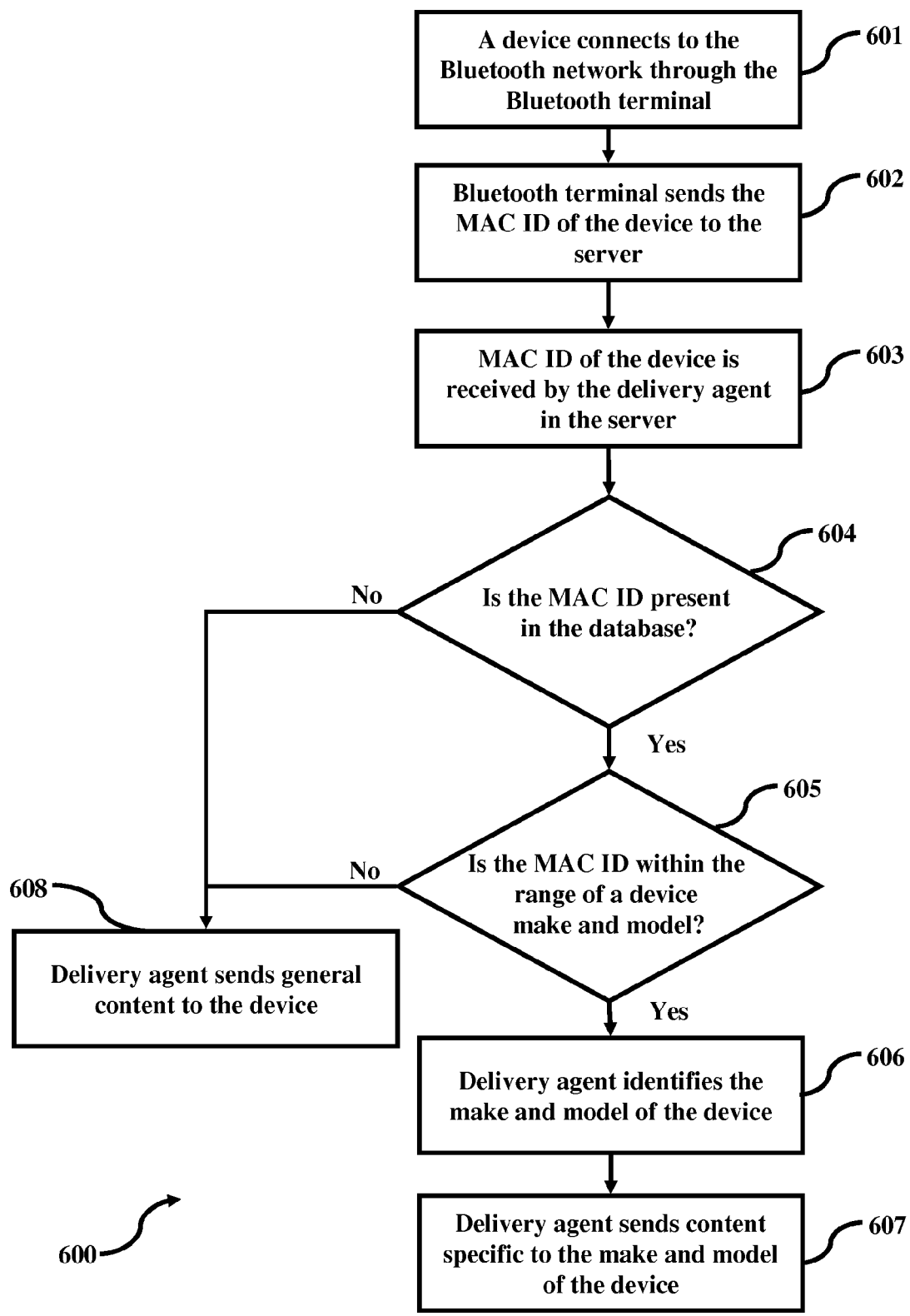
FIG. 6 is a flowchart depicting a process, in accordance with embodiments disclosed herein.

FIG. 6 is a flowchart depicting a process, in accordance with embodiments disclosed herein. A plurality of Bluetooth terminals 102 connected to central server 101 forms a Bluetooth network, providing coverage to a specific area. The communication devices 103 using Bluetooth can connect to the Bluetooth network through the Bluetooth terminal 102. Once the communication device 103 connects (601) to the Bluetooth network through the Bluetooth terminal 102, the Bluetooth terminal 102 receives information about the communication device 103, including the MAC ID of the communication device 103. The Bluetooth terminal 103 sends (602) the MAC ID of the device to the server 101. The delivery agent 202, present in the server 101, receives (603) the MAC ID of the communication device 103. The delivery agent 202 checks (604) the device database 201 for the MAC ID. If the MAC ID is present in the database, the delivery agent 202 further checks (605) if the received MAC ID is within the range of MAC IDs for a particular make and model of communication device 103. If the received MAC ID is within the range of MAC IDs for a particular make and model of communication device 103, the delivery agent 202 is able to identify (606) the make and model of the communication device 103. Once the delivery agent 202 identifies the make and model of the communication device 103, then customized content specifically tailored to the make and model of the communication device 103 is send (607) to the communication device. The content sent to the communication device 103 depends on the capabilities and services present on the communication device 103. For example, a communication device 103 capable of displaying flash content, will get content richer in flash content, as compared to a second communication device 103 which can only display textual content, which will get only content in text format. If the delivery agent 202 does not find the MAC ID of the communication device 103 in the device database 201, then general content is send (608) to the communication device 103. Also, if the delivery agent 202 does not find the received MAC ID within the range of MAC IDs for a particular make and model of communication device 103 i.e. the delivery agent is unable to identify the make and model of the communication device, then general content is send (608) to the communication device 103. The various actions in method 600 may be performed in the order presented, in a different order or simultaneously. Further, in some embodiments, some actions listed in FIG. 6 may be omitted.

Figure 7:
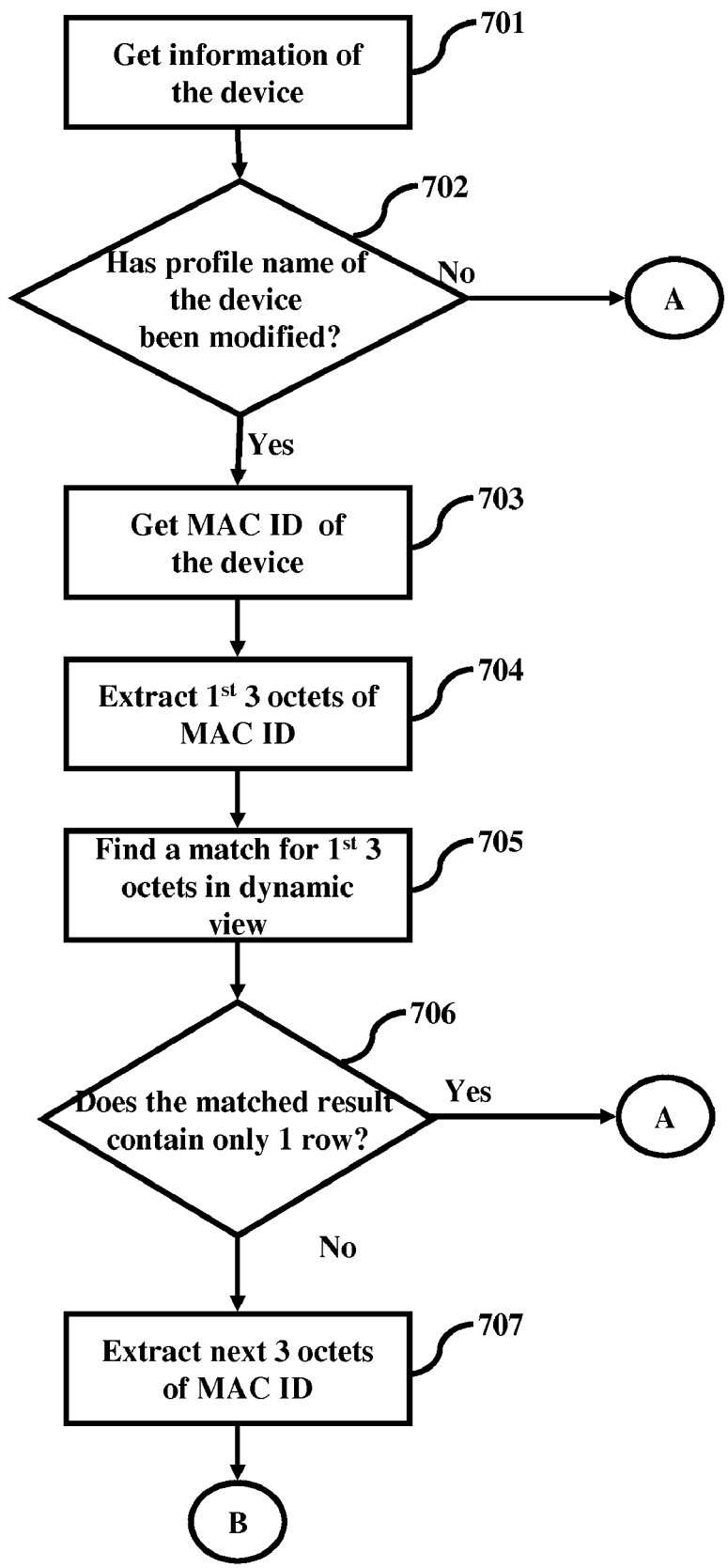
FIG. 7 is a flowchart depicting a process, in accordance with embodiments disclosed herein.
Figure 7:
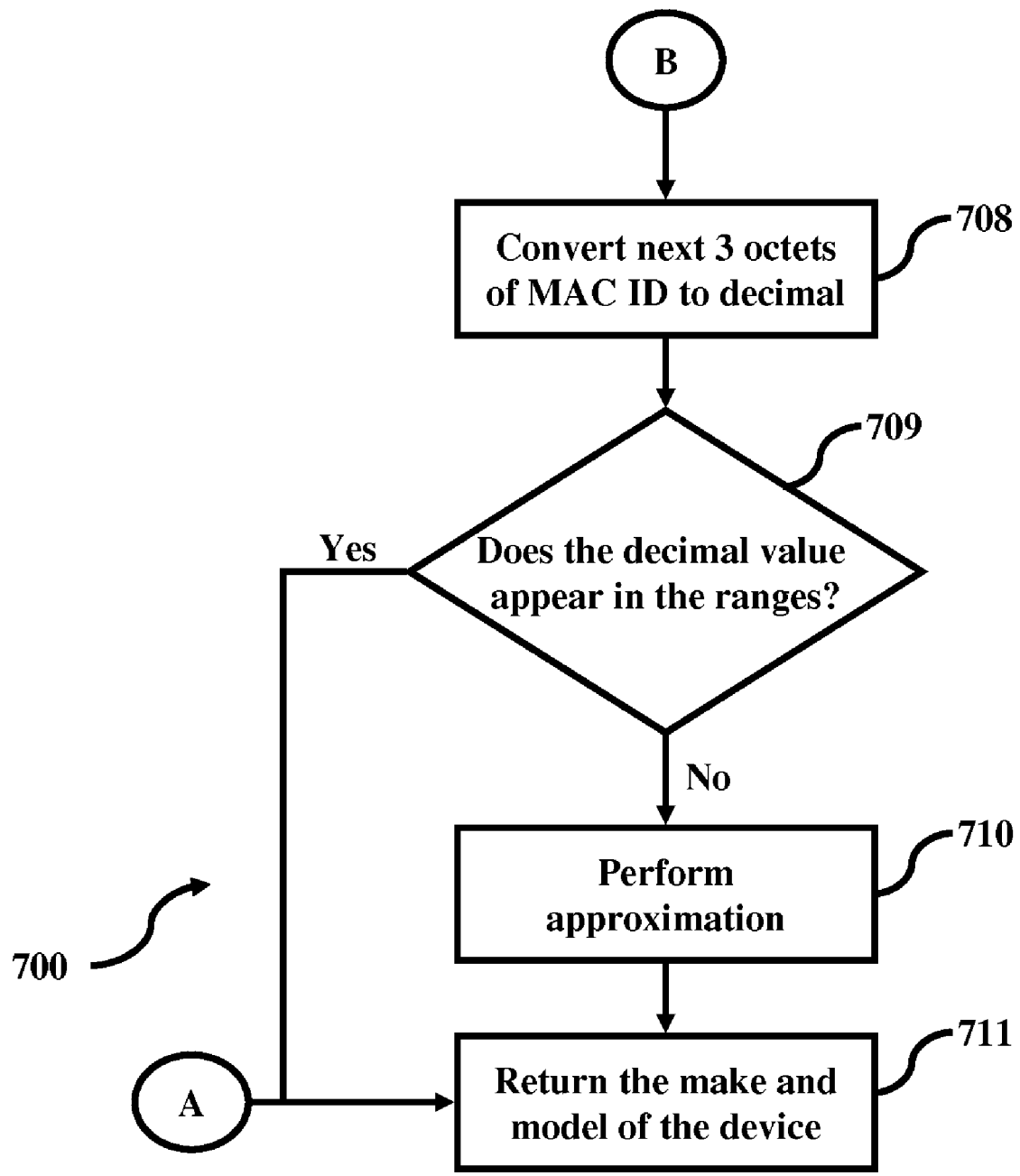

FIG. 7 is a flowchart depicting a process, in accordance with embodiments disclosed herein. A plurality of Bluetooth terminals 102 connected to central server 101 forms a Bluetooth network, providing coverage to a specific area. The communication devices 103 using Bluetooth can connect to the Bluetooth network through the Bluetooth terminal 102. Once the communication device 103 connects to the Bluetooth network through the Bluetooth terminal 102, the Bluetooth terminal 102 receives (701) information about the communication device 103, including the MAC ID and profile name of the communication device 103. The Bluetooth terminal 102 forwards the information received from the communication device 103 to the server 101. The server checks (702) if the profile name is present in a keyword table. If the profile name is present in the keyword table, then the server 101 retrieves (711) the make and model of the communication device 103. If the profile name if not present in the keyword table, then the unknown profile name is added to a view of unknown profile names, which is further used to populate the keyword tables and the device master tables. If the profile name is not present in the keyword table, then the server checks (703) the MAC ID of the communication device 103. The server 101 extracts (704) the first three octets of the MAC ID. The server then checks (705) if there are matches for the first three octets of the MAC ID in the dynamic view. If the server returns only one matching row from the dynamic view, then the server 101 retrieves (711) the make and model of the communication device 103. If the server returns more than one matching row from the dynamic view table, then the server 101 extracts (707) the next three octets of the MAC ID of the communication device 103 and converts (708) the next three octets into their corresponding decimal value. The server 101 checks (709) if the decimal value of the next three octets of the MAC ID fall within the minimum and maximum ranges of any of the rows of the dynamic view table. If the decimal value of the next three octets of the MAC ID falls within the minimum and maximum ranges of any of the rows of the dynamic view table, the server retrieves (711) the make and model of the communication device 103. If the decimal value of the next three octets of the MAC ID do not fall within the minimum and maximum ranges of any of the rows of the dynamic view table, then the server 101 performs (710) approximation. The server performs approximation by taking the returned maximum column of the previous row of the dynamic view table to the minimum column of the next row. The server 101 performs approximation on the entire dynamic view table and the closest of the results will be considered by the server 101 to retrieve (711) the make and model of the communication device 103. The various actions in method 700 may be performed in the order presented, in a different order or simultaneously. Further, in some embodiments, some actions listed in FIG. 7 may be omitted.

Figure 8:
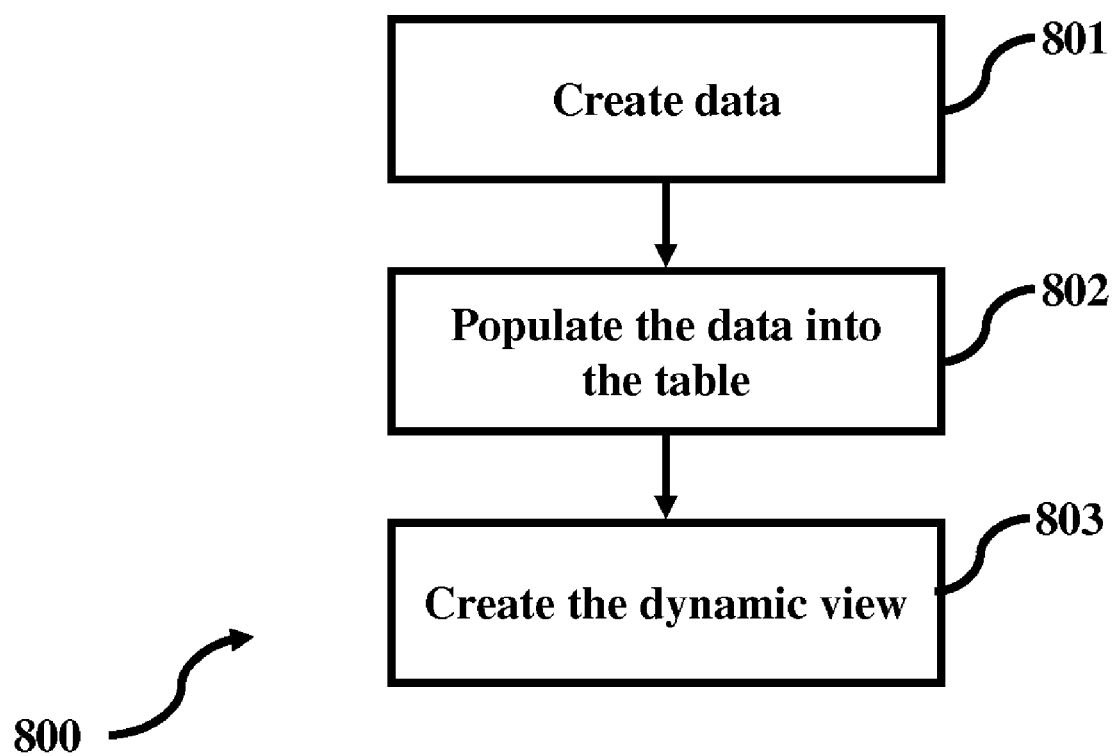
FIG. 8 is a flowchart depicting a process, in accordance with embodiments disclosed herein.

FIG. 8 is a flowchart depicting a process, in accordance with embodiments disclosed herein. A plurality of Bluetooth terminals 102 connected to central server 101 forms a Bluetooth network, providing coverage to a specific area. The communication devices 103 using Bluetooth can connect to the Bluetooth network through the Bluetooth terminal 102. Once the communication device 103 connects to the Bluetooth network through the Bluetooth terminal 102, the Bluetooth terminal 102 receives information about the communication device 103, including the MAC ID and profile name of the communication device 103. The Bluetooth terminal 102 forwards the information received from the communication device 103 to the server 101. The server 101 builds (801) a database comprising of a large number of profile names and MAC IDs from multiple communication devices in the form of a data keyword table, as shown in table 1.

TABLE 1

| Profile ID | Profile name | Model No. |
|---|---|---|
| 1 | Nokia 6600 | 1 |
| 2 | 6600 | 1 |
| 3 | Nokia 6600 | 1 |

The keyword table comprises of all the probable profiles. The profile ID field in Table 1 is an auto generated identification code. The profile name field is the profile name string captured in the information from the communication device 103. The model No. field depicts the mapping of the profile to the master table of devices, depicted in Table 2. In Table 2, the make and model of communication devices are mapped to the profile name.

TABLE 2

| Model No. | Make | Model |
|---|---|---|
| 1 | Nokia | 6600 |
| 2 | Nokia | N75 |
| 3 | Nokia | N93 |
| 4 | Nokia | N73 |
| 5 | Nokia | N72 |

The server 101 populates (802) the table; as shown in table 3; with data from the database comprising of a large number of profile names and MAC IDs from multiple communication devices.

TABLE 3

| MAC Address | Profile Name |
|---|---|
| 00:02:ee:1e:e7:08 | Nokia 6310i |
| 00:02:ee:20:c0:6d | Nokia 6310i |
| 00:0e:6d:05:57:ae | 6600 |
| 00:0e:6d:48:46:3e | Nokia 6600 |
| 00:0e:6d:48:46:7d | Nokia 6600 |

The server 101 creates (803) a dynamic view, as shown in table 4. The server 101 uses the dynamic view table to identify the make and model of the communication devices 103.

TABLE 4

| Model No. | Minimum | Maximum | 1$^{st}$ octets | Make | Model |
|---|---|---|---|---|---|
| 1 | 5915197 | 5915197 | 00:0e:6d | Nokia | 3660 |
| 4 | 2234856 | 15020916 | 00:60:57 | Nokia | 6310i |
| 3 | 2025224 | 2146413 | 00:02:ee | Nokia | 6310i |
| 4 | 6037622 | 11036242 | 00:0e:6d | Nokia | 6310i |
| 27 | 350126 | 15228307 | 00:0e:6d | Nokia | 6600 |
| 2 | 15206295 | 15206295 | 00:60:57 | Nokia | 6600 |
| 6 | 595383 | 3562689 | 00:13:e0 | Nokia | 6600 |

The various actions in method 800 may be performed in the order presented, in a different order or simultaneously. Further, in some embodiments, some actions listed in FIG. 8 may be omitted.

Figure 9:
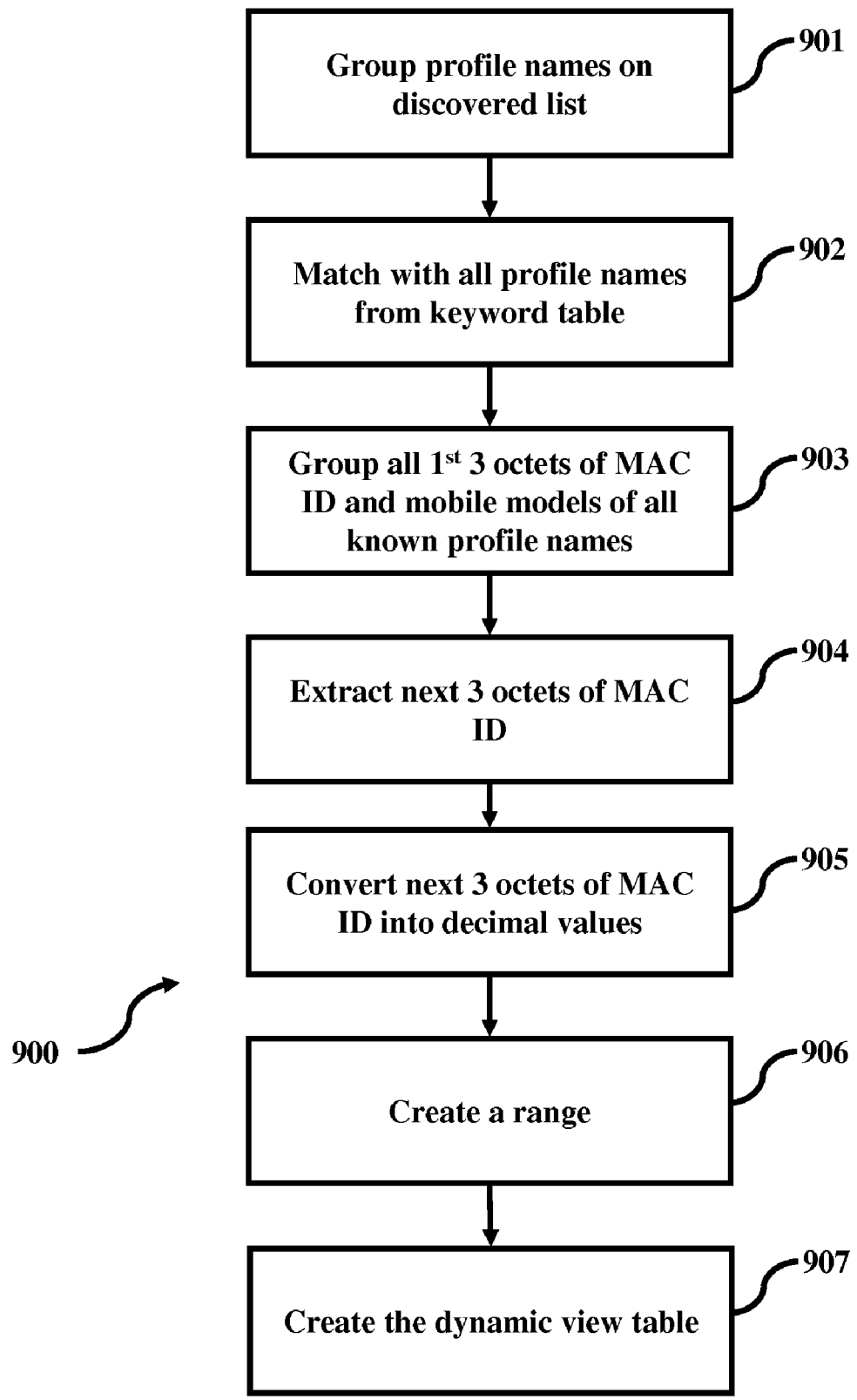
FIG. 9 is a flowchart depicting a process, in accordance with embodiments disclosed herein.

FIG. 9 is a flowchart depicting a process, in accordance with embodiments disclosed herein. A plurality of Bluetooth terminals 102 connected to central server 101 forms a Bluetooth network, providing coverage to a specific area. A plurality of communication devices 103 using Bluetooth can connect to the Bluetooth network through the Bluetooth terminal 102. Once the communication device 103 connects to the Bluetooth network through the Bluetooth terminal 102, the Bluetooth terminal 102 receives information about the communication devices 103, including the MAC ID and profile name of the communication devices 103. The Bluetooth terminal 102 forwards the information received from the communication devices 103 to the server 101 in the form of a list. The server 101 groups (901) all the similar profile names present in the list received from the Bluetooth terminal 102. Default profile names are assigned by the manufacturer of the communication device 103, which may or may not be modified by the users of the communication devices 103. The server 101 matches (902) the groups with all the known profile names, present in table 1. If one or more profile names do not match an entry in table 1, then the unknown profile names are separated and further used to populate Tables 1 and Table 2. The server 101 groups (903) all the first three octets of the MAC IDs of communication devices 103 with known profile names to obtain blocks of data. The server 101 extracts (904) the next three octets of the MAC IDs of communication devices 103 with known profile names and converts (905) them into decimal values. The server 101 creates (906) a range with minimum and maximum values. The minimum value of the range is the least decimal value of the next three octets of the MAC IDs of a given group of communication devices 103. The maximum value of the range is the highest decimal value of the next three octets of the MAC IDs of a given group of communication devices 103. The server 101 uses all the above information to create (907) the dynamic view table, as shown in table 4. The various actions in method 900 may be performed in the order presented, in a different order or simultaneously. Further, in some embodiments, some actions listed in FIG. 9 may be omitted.

If for an existing range of decimal values of next three octets from X to Y for a particular make A and model B has been identified and a communication device of a different make, say C with a decimal value of next three octets, X' has been identified as falling within the same range X-Y, then the range for make A and model B is split up into two ranges; the first range from X to (X'−1) and the second range from (X'+1) to Y and a new entry is created for C with a minimum and maximum value equals to X'.

Table 4 is constantly updated with new makes and models of communication devices, which may be connected to the Bluetooth network. When a new device of make A and model B, which is already present in the table, but with a decimal value of the last three octets that does not fall within the specified range of X-Y, then a new entry is made in table 4 with the range which has a minimum and maximum equals to the decimal value of the new device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the disclosed embodiments.

What is claimed is:

1. A method for identifying make and model of a communication device using Bluetooth, wherein a plurality of communication devices are connected to a Bluetooth network, said Bluetooth network comprising of a plurality of Bluetooth terminals and a server, said method comprising:

said plurality of Bluetooth terminals collecting information from said plurality of communication devices;

said server building one or more tables, wherein said tables map a range of MAC IDs based on a signature of a plurality of features and information collected of said plurality of communication devices to at least a make and model of said plurality of communication devices;

said server identifying make and model of a communication device using MAC ID of said communication device and said table; and said server delivering content to said communication device using Bluetooth, wherein said content is customized according to at least a make and model of said communication device.

2. The method as claimed in claim 1, wherein said information collected by said Bluetooth terminals comprises:

MAC IDs of said plurality of communication devices;

profile names of said plurality of communication devices; and services running on said plurality of communication devices.

3. A method for identifying a make and model of a communication device using Bluetooth, wherein a plurality of communication devices are connected to a Bluetooth network, said Bluetooth network comprising a plurality of Bluetooth terminals and a server, said method comprising:

said plurality of Bluetooth terminals collecting information from said plurality of communication devices;

said server building one or more tables, wherein said tables map a range of MAC IDs based on signature of plurality of features and information collected of said plurality of communication devices to make and model of said plurality of communication devices;

said server identifying make and model of a communication device related to said communication device using MAC ID of said communication device and said table; and said server delivering content to said communication device using Bluetooth, wherein said content is customized according to make and model of said communication device, wherein said server updates said table, on receiving a MAC ID not present in said table.

4. The method as claimed in claim 1, wherein said server is configured to update said table, on receiving a MAC ID of a communication device, when there is a change in information relating to the communication device.

5. A server apparatus, said server apparatus connected to a plurality of Bluetooth terminals and said Bluetooth terminals connected to a plurality of communication devices using Bluetooth, said server apparatus comprising:

receiving means to receive information about said plurality of communication devices from said plurality of Bluetooth terminals;

creation means for creating a table, wherein said table maps a range of MAC IDs based on a signature of a plurality of features and information collected of said plurality of communication devices to at least a make and model of said communication devices;

identification means for identifying make and model of said communication device using MAC ID of said communication device and said table; and delivery means for delivering content to said communication device using Bluetooth, wherein said content is customized according to at least a make and model of said communication device.

6. A server apparatus, said server apparatus connected to a plurality of Bluetooth terminals and said Bluetooth terminals connected to a plurality of communication devices using Bluetooth, said server apparatus comprising:

receiving means to receive information about said plurality of communication devices from said plurality of Bluetooth terminals;

creation means for creating a table, wherein said table maps a range of MAC IDs based on a signature of a plurality of features and information collected of said plurality of communication devices to at least a make and model of said communication devices;

identification means for identifying make and model of said communication device using MAC ID of said communication device and said table; and delivery means for delivering content to said communication device using Bluetooth, wherein said content is customized according to at least make and model of said communication device, wherein said server apparatus further comprises means for updating said table, on receiving a MAC ID not present in said table.

7. A terminal, said terminal connected to a server and a plurality of communication devices using Bluetooth, said terminal comprising of a means adapted to collect information from a plurality of communication devices, said information comprising:

MAC IDs of said plurality of communication devices;
profile names of said plurality of communication devices; and
services running on said plurality of communication devices.

8. The method as claimed in claim 1, wherein said tables comprise at least one of data process information, screen dimension of said identified communication device, information on services that can be run on said identified communication device, information on processing capability of said identified communication device.

9. The method as claimed in claim 3, wherein said tables comprise at least one of data process information, screen dimension of said identified communication device, information on services that can be run on said identified communication device, information on processing capability of said identified communication device.

10. The method as claimed in claim 1, wherein upon identification of the make and model of said communication device said content is customized according to capabilities and services present on said communication device.

11. The method as claimed in claim 3, wherein upon identification of the make and model of said communication device said content is customized according to capabilities and services present on said communication device.

12. The server apparatus as claimed in claim 5, wherein upon identification of the make and model of said communication device said content is customized according to capabilities and services present on said communication device.

13. The server apparatus as claimed in claim 6, wherein upon identification of the make and model of said communication device said content is customized according to capabilities and services present on said communication device.

14. The server apparatus as claimed in claim 6, wherein said information about said plurality of communication devices from said plurality of Bluetooth terminals comprises:

MAC IDs of said plurality of communication devices;
profile names of said plurality of communication devices; and
services running on said plurality of communication devices.

15. The server apparatus as claimed in claim 6, wherein said means for updating said table, on receiving a MAC ID not present in said table comprises:

a sniffer configured to check for presence of the MAC ID of a communication device in a device database;

a signature module and a services module configured to provide information about said communication device to said sniffer, upon absence of the MAC ID of said communication device;

an indexer configured to receive the information about said communication device;

an internal database configured to store the information about said communication device; and a device identification engine configured to collect the information about said communication device stored in the internal database of the indexer at regular intervals, the device identification engine configured to identify make and model of said communication device based on the MAC ID of said communication device, and the device identification engine configured to update the identified make and model of said communication device in said table stored in the device database present in the server apparatus.

* * * * *